United States Patent [19]

Barr et al.

[11] Patent Number: 4,628,302

[45] Date of Patent: Dec. 9, 1986

[54] LIQUID LEVEL DETECTION SYSTEM

[75] Inventors: A. Brinkley Barr, Woodinville; D. Craig Edwards, Bellevue, both of Wash.

[73] Assignee: Baker International Corporation, Orange, Calif.

[21] Appl. No.: 651,047

[22] Filed: Sep. 14, 1984

[51] Int. Cl.[4] .................................. G08B 21/00
[52] U.S. Cl. .................... 340/620; 73/304 R; 324/65 R; 340/59
[58] Field of Search ............... 340/602, 604, 620, 59; 204/402; 73/304 R; 324/65 R, 65 P

[56] References Cited

U.S. PATENT DOCUMENTS

| | | | |
|---|---|---|---|
| 2,999,230 | 9/1961 | Laakmann | 340/620 |
| 3,291,149 | 12/1966 | Atkins et al. | 340/620 |
| 3,644,885 | 2/1972 | Radin | 340/59 |
| 3,694,804 | 9/1972 | Hill | 340/620 X |
| 3,944,845 | 3/1976 | Luteran | 340/620 X |
| 4,110,740 | 8/1978 | Akita et al. | 340/620 |
| 4,263,587 | 4/1981 | John | 340/620 |

Primary Examiner—James L. Rowland
Assistant Examiner—Daniel Myer
Attorney, Agent, or Firm—Burns, Doane, Swecker & Mathis

[57] ABSTRACT

A detector system for sensing the presence, or absence, of electrically-conductive liquid in contact with two probe members. The system includes switchable voltage sources to selectively establish a potential across capacitors connected to the probe members, and detection systems for sensing the magnitudes of charges on the capacitors. The magnitudes of the sampled charge at given intervals is indicative of the presence, or absence, of ionic liquid in contact with the probe members.

21 Claims, 9 Drawing Figures

Fig_1

Fig_2

Fig_3

Fig_4

Fig_5

Fig_6

Fig_7

Fig_8

Fig_9

LIQUID LEVEL DETECTION SYSTEM

BACKGROUND OF THE INVENTION

1. Field of the Invention

The present invention relates to a system for detecting the level of liquid within a vessel and, more particularly, to the detection of the level of an electrically-conductive liquid in a vessel.

2. Description of the Prior Art

Various devices are utilized, or have been suggested, for electrically determining the level of liquid within a vessel. Nevertheless, satisfactory and dependable measurement of liquid level based upon electrical conductivity within a liquid (i.e. based upon ionic properties of the liquid), has been hampered by several problems. One difficulty may arise from physical degradation by electrolysis of the metallic probes which are in contact with the ionic liquid for purposes of level detection; that is, the probes may be corroded by electrochemical transport of metal ions into the ionic liquid, or may become plated with metal which is electrochemically drawn out of solution. In either case, the probes may produce erratic output signals which vary depending upon the degree of plating or corrosion of the probes; such variances in signal strength may cause errors in the measurement of liquid level within a containing vessel.

SUMMARY OF THE PRESENT INVENTION

A primary object of the present invention is to provide an improved system and method for detecting the presence or absence of an electrically-conductive liquid at a particular level within a vessel, particularly vessels such as radiators for motorized vehicles. More particularly, an object of the present invention is to provide such a system having improved reliability for detecting liquid level with metallic probes located within an ionic liquid, which detection system operates to minimize electrochemical degradation of the metallic probes.

Yet another object and advantage of the present invention is the provision of such a system and method for detecting the level of an electrically conductive liquid within a vessel with means integral to the detection system for indicating circuit faults in the detection system.

In accordance with the preceding objects, the present invention, in its preferred embodiment, provides a system for detecting the level of an ionic liquid in a vessel, which system includes first and second metallic probe members mounted at a fixed location within the vessel, first and second capacitors connected to the respective probe members, first switch means to selectively couple the first capacitor means to ground and second switch means to concomitantly couple a constant voltage source to the second capacitor means, and comparator means in electrical communication with the second capacitor to sense the magnitude of the electrical charge thereon at a predetermined time period following coupling of the voltage source to the second capacitor. The magnitude of the electrical charge detected on the capacitor by the comparator means at the predetermined time is indicative of the presence, or absence, of ionic liquid surrounding the second probe member.

The system in the preferred embodiment includes a diode connecting the first and second capacitors so that current flows through the diode only from the first capacitor to the second capacitor, and a second comparator coupled to the first capacitor to sense the magnitude of charge on the first capacitor at times when the first capacitor is coupled to a constant voltage source and the second capacitor is connected to ground.

Over an operating cycle, the first and second capacitor means are alternatively connected between ground and a constant voltage source. Accordingly, with the first and second probe members mounted in close enough proximity to one another that each provides a local ground for the other, there will be no net charge transferred to, or from, the probe members over an operating cycle of the system.

The preferred embodiment of the present invention, as briefly summarized above, provides an improved system for determining the level of an electrically conductive liquid, which system operates especially reliably because of its self-test capabilities, because it requires no calibration during normal operation, and because it operates to minimize electrochemical degradation of the metallic probe members.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figures 1, 2, 3:
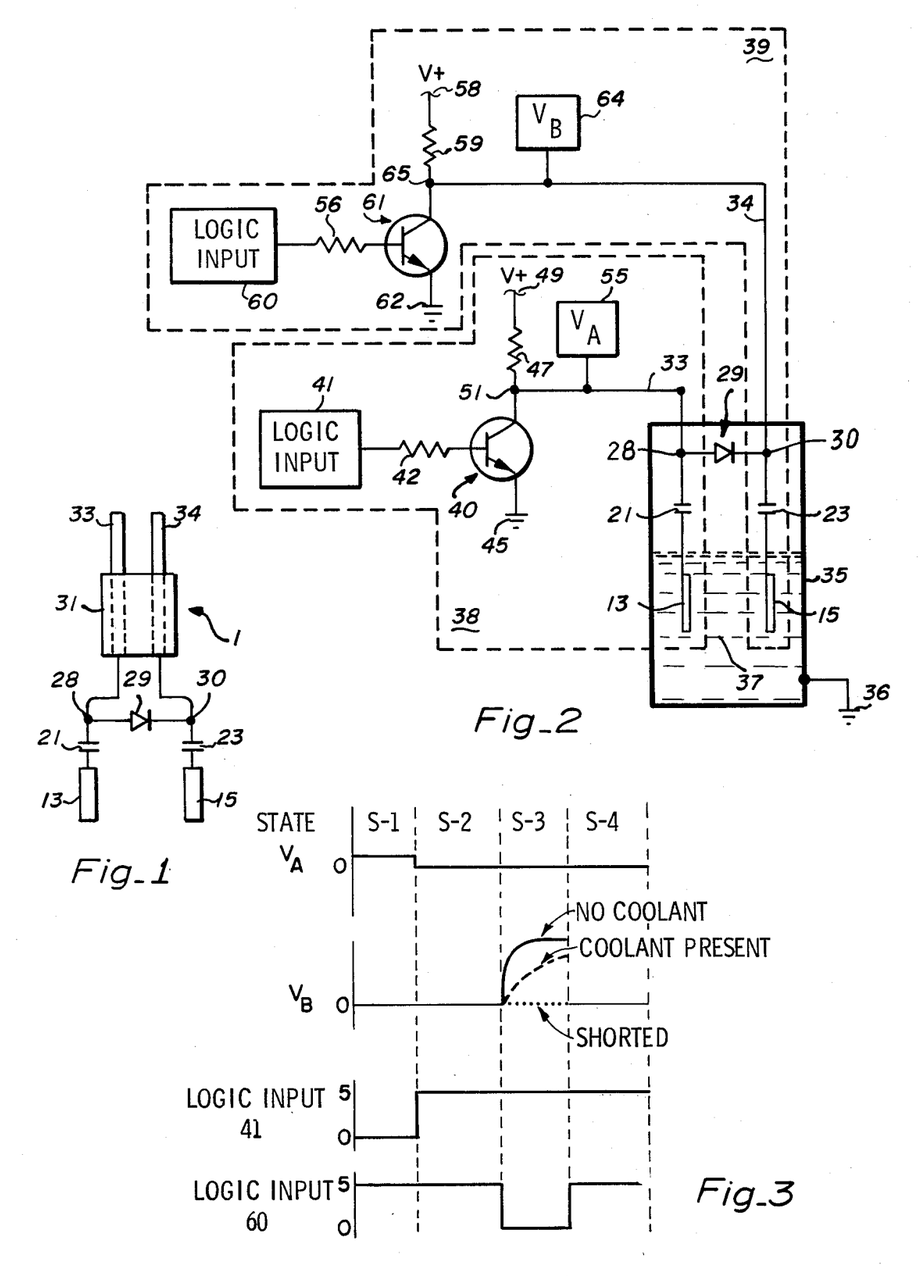
FIG. 1 is a schematic detail of a sensor means of the system of this invention for detecting the level of an ionic liquid in a vessel.
FIG. 2 is a schematic electrical diagram of a system according to the present invention incorporating the sensor means of FIG. 1.
FIG. 3 is a diagram which graphically illustrates various states representative of operation over time of the system of FIG. 2.

In the level sensor means generally designated 1 in FIG. 1, a probe member 13 is connected in series to a capacitor 21 which, in turn, is connected to a conductor 33 which extends through an insulating socket member 31. Also, the illustrated sensor means includes a second probe member 15 connected to a capacitor 23 which, in turn, is connected to a second conductor 34 which extends through the insulating socket member 31. The conductors 33 and 34 are connected to one another adjacent the capacitors 21 and 23 by a diode 29 conducts current from conductor 33 to conductor 34 via nodes 28 and 30, but not in the opposite direction.

Referring now to FIG. 2 of the Drawings, the probe members 13 and 15 are shown mounted at a predetermined location within a vessel 35 which contains a body 37 of ionic liquid. The vessel can be grounded, for example, by means 36. (For reasons of convenience of illustration, the insulating socket member 31 is not shown in FIG. 2.) In one especially advantageous application of the present invention, the vessel 35 is a radiator for a motorized vehicle, and the ionic liquid is water plus any other electrically-conductive substance which may be in solution in the water to act as an additive or a coolant in the radiator.

As further shown in FIG. 2, the probe members 13 and 15 are connected, via the conductors 33 and 34, to respective first and second detection circuits or "channels" 38 and 39. The first detection channel 38 includes a switch means or relay, generally indicated by numeral 40, connected for actuation by a digital logic input means 41 via an input resistor 42. One pole of the first switch means 40 is connected, at node 51, to a resistor 47 in series with a DC voltage source 49. (Typically, the voltage source 49 will be about +5 volts.) The other pole of the first switch means 40 is connected to ground 45. Further, in the first detection channel 38, the conductor 33 is connected to the node 51.

A voltage sensing means 55 is connected to detect the voltage at node 51. Although the voltage sensing means 55 can take various embodiments, it can simply be a wire leading to logic circuitry as will be described in conjunction with FIG. 9.

Referring now specifically to the first switch means 40 in the system of FIG. 2, that switch means is shown as a conventional transistor having a base, an emitter, and a collector. When connected as shown, the transistor operates as an "on-off" switch controlled by the signal provided to its base by the logic input means 41, a signal source, via the input resistor 42. In the situation where the input logic signal to the base of the transistor is "low" (typically, less than about +0.4 volts), the transistor functions as an "open" or nonconducting switch, and will not permit the flow of electrical current to ground 45 between the emitter and collector. However, when the signal from the first logic input means 41 to the base of the transistor is "high" (typically, in excess of about +0.8 volts), the transistor functions as a "closed" or conducting switch, and will transmit current between its emitter and collector to the ground 45 with essentially no resistance. Accordingly, in the closed configuration, the transistor will serve to ground the node 51.

Although first switch means 40 has been specifically shown and described as a bipolar device (i.e., a transistor) it should be appreciated that other switching devices will readily suggest themselves to workers skilled in this art. For example, the switching means 40 could be a FET device, open-collector digital driver integrated circuits, or mechanical contacts.

The second detection channel 39 of the illustrated level detection system includes a second switch means or relay, generally indicated by the numeral 61, which is actuated by a second digital logic input means 60 via an input resistor 56 to be either in an electrically conducting or nonconducting condition. In a manner essentially identical to the arrangement in the first channel 38, one pole of the second switch means 61 is connected, at node 65, in series with a resistor 59 and a DC voltage source 58. (In the preferred embodiment, the potential at the voltage source 58 is equal to the potential at the voltage source 49.) The other pole of the second switch means 61 is connected to a ground 62. Also in the second channel 39, the conductor 34 is connected to the node 65.

The second switch means 61 is also shown as a conventional transistor connected in a manner essentially identical to the switch means 40 in the first detection channel 38. (Like the first switch means 40, the second switch means 61 could take the form of a switching device other than a transistor.) Accordingly, the switch means 61 operates as a normally open on-off switch controlled by signals provided by the logic input means 60, a signal source via the input resistor 56. In the situation where the signal from the second logic input means 60 is low (here again, typically below +0.4 volts), the switch means 61 functions as an open switch to prevent the flow of electrical current to the ground 62. However, when the signal provided by the second logic input means 60 is high (again, typically exceeding about +0.8 volts), the second switch means 61 will be "closed" and, accordingly, will transmit current directly to ground 62, thereby grounding the nodes 65 and 30.

Also in the second detection channel 39, a second voltage sensing means 64 is connected to detect the voltage at node 65. Although the voltage sensing means 64 may take various embodiments, it can simply be a wire leading to logic circuitry such as will be described in conjunction with FIG. 7.

In conjunction with FIG. 3, the following is a description of the voltages which occur at nodes 51 and 65 in the level detection system of the present invention as a result of signals generated by logic input means 41 and 60. As shown, the logic input means 41 and 60 selectively generate square wave voltage pulses having a magnitude, for example, of about +5 volt. That is, the logic input means 41 and 60 can each selectively generate the aforementioned "high" or "low" signals. Accordingly, there are four possible combinations of signals provided by logic input means 60 and 41 taken together: high-low, high-high, low-high, and low-low. In FIG. 3, the first three of these combinations are illustrated by states S-1, S-2 and S-3, respectively. (State S-4 is a high-high combination as in state S-2.)

In practice, the first and second logic input means 41 and 60 preferably are conventional oscillators, say comprised of one-shot multivibrators or other well known digital logic pulse generating means, which automatically serve to generate the square-wave signals shown in FIG. 3. With such devices, when power is provided to the level detection system of the present invention, the states S-1 through S-3 are sequentially generated, say about every 0.06 seconds.

For purposes of explanation, the first state to be considered will be S-1, and it will be assumed that capacitors 21 and 23 have been previously completely discharged to ground. As a result of the logic input signal from the logic input means 41 being low and the signal from logic input means 60 being high in state S-1, switch means 40 is open (i.e., non-conducting) and switch means 61 is closed (i.e., non-conducting). With switch means 61 closed, the second capacitor 23 will remain discharged to the ground 62 through conductor 34 and, hence, the capacitor 23 is unaffected by voltage source 58. Also in state S-1, current will flow from the voltage source 49 through resistor 47 and conductor 33, then through the diode 29 and conductor 34 to ground 62. In other words, during state S-1 the voltage source 49 is connected to the ground 62 via the resistor 47 and the diode 29; accordingly, under normal conditions in state S-1, the voltage sensing means 55 will detect a voltage $V_A$ at node 51 equal to the forward drop across the diode 29, or typically about +0.6 volts. Thus, under normal operating conditions with the probe 13 immersed in ionic liquid in state S-1, the capacitor 21 will charge until its potential rises to that of the voltage drop across the diode 29. That is, the capacitor 21 will gain charge (and voltage) in state S-1 as the ionic liquid electro-chemically conveys charge to the probe 13 from the probe 15, and/or from the ground 36 for the vessel 35. The amount of charge conveyed electrochemically during state S-1 can be readily calculated to be $q=CV=0.6$ C, where "C" is the capacitance constant for the capacitor 21.

Figure 6:
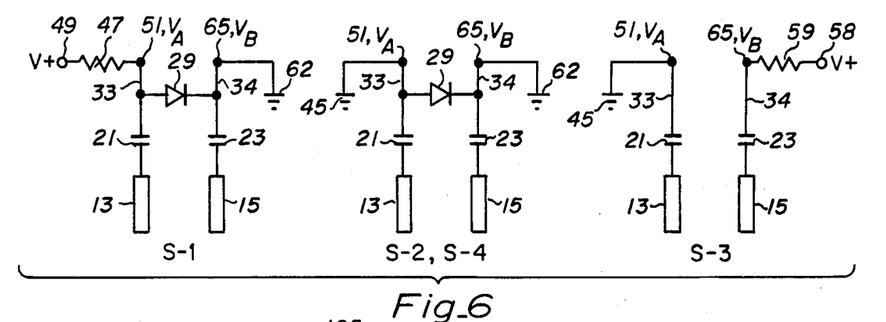
FIG. 6 is a schematic diagram which, in simplified form, illustrates the condition of the circuitry of the system of FIG. 2 during the states S-1, S-2, S-3 and S-4 depicted in FIG. 3.

The condition of the circuitry of FIG. 2 during state S-1 is shown in simplified form in FIG. 6. This drawing is not intended to depict the actual physical circuitry, but is provided to facilitate understanding of the previously-discussed preferred embodiment. Thus, in FIG. 6, it can be seen that the voltage $V_B$ measured at node 65 during state S-1 is at ground potential, and that the voltage $V_A$ measured at node 51 will exceed ground by the voltage drop caused by diode 29.

During operation in state S-1, if the voltage $V_B$ exceeds the expected voltage drop across the diode 29 (i.e., about 0.6 volts), this will serve as an indication of at least one of several faults in the system. A fault could be that either conductor 33 or 34 is open-circuited, or that the diode 29 is open-circuited, or that the probe assembly as shown in FIG. 1 is connected backwards. On the other hand, if the voltage $V_A$ is less than about 0.6 volts, other circuit faults may be indicated. For example, the circuit may be short circuited to ground through conductors 33 or 34, or there may be a short circuit through diode 29. This ability to determine potential faults in the circuitry is known as a "self-test" feature, and is an important aspect for providing a reliable system according to the present invention.

Referring now to state S-2 in FIG. 3, the signal provided from logic input means 60 remains high (so that switch 61 remains closed, thereby keeping node 65 at ground potential) and the signal provided by the logic input means 41 goes high, thereby closing the first switch means 40 so that node 51 is connected to the ground 45.

Again, FIG. 6 shows the condition of the circuitry of FIG. 2 during state S-2. From FIG. 6, it can readily be seen that capacitors 21 and 23 are both connected to ground in state S-2. If the probe member 13 is immersed in ionic liquid when state S-2 is initiated, the capacitor 21 will discharge to to the ground 45 and, thereby, electrochemically draw ions to the probe member 13 through the ionic liquid 37. In fact, the quantity of charge drawn to the probe member 13 in state S-2 will equal the flow of charge in the opposite direction from the probe member 13 during the state S-1. Therefore, considering states S-1 and S-2 together, there will be no net charge transferred from the probe member 13 and, accordingly, no electrolysis should occur to degrade the surface of the probe member 13 due to either plating or corrosion.

At this juncture, it should be appreciated that states S-1 and S-2 are primarily for purposes of self-testing the circuitry. In neither state S-1 nor S-2 is there made an unequivocal determination as to the presence, or absence, of ionic liquid surrounding the probe members 13 and 15.

Referring now to state S-3 in FIG. 3, this state is initiated by the signal from the digital logic input means 60 going low while the signal from the logic input means 41 remains high. Thus, in state S-3, the first switch means 40 remains closed (i.e., conducting) and the second switch means 61 is opened. As a result, the nodes 51 and 28 will remain connected directly to ground 45, and the node 65 will be placed in electrical communication with the voltage source 58, via resitor 59. One result of these conditions is that diode 29 will be reversed-biased, so that no current will flow through the diode 29 from node 51 to node 65. Accordingly, in normal operation of the circuitry in state S-3, the diode 29 electrically isolates the first detection channel 38 from the second channel 39, and the conditions in the first detection channel 38 will remain the same as they were in state S-2. In the second detection channel 39, however, with the switch means 61 open and the capacitor 23 in series with the resistor 59 and the constant voltage source 58, current will flow to build charge upon the capacitor 23.

Again, FIG. 6 shows the condition of the circuitry of FIG. 2 during state S-3 in simplified form (e.g., the diode 29 has been omitted, because it acts as an open circuit in state S-3).

During normal operation of the circuitry in state S-3, the rate at which the capacitor 23 accumulates charge depends upon the environment of the probe member 15. When the probe member 15 is immersed in electrically conductive liquid, charge will electrochemically flow from the probe member 15 while capacitor 23 is being charged; accordingly, the voltage across the capacitor 23 will build in a manner as indicated by the dashed line in state S-3 in FIG. 3. The voltage $V_B$ which appears at node 65 is representative of the charge on the capacitor 23, and will be sensed by the second voltage sensing means 64.

The duration of state S-3 and the values of the components utilized in the circuitry according to the present invention should normally be chosen such that capacitor 23 cannot fully charge (i.e., reach the potential of voltage source 58) prior to expiration of state S-3.

If the probe member 15 is not in contact with an ionic liquid in state S-3 (say because the level of the liquid has fallen below the fixed location of the probe member 15 in the vessel 35 of FIG. 2), the rate of increase of voltage at node 65 will be relatively more rapid, as indicated by the solid curve in the state S-3 in FIG. 3. The relatively rapid rise in the level of the voltage at node 65 is due to the fact that the probe member 15 acts as an open circuit when it is not surrounded by an ionic liquid. Again, in this situation, the voltage $V_B$ at node 65 will be sensed by the sensing means 64.

The dotted line in state S-3 in FIG. 3 illustrates the situation where the voltage measured at node 65, as indicated by the sensing means 64, does not change substantially from zero. This condition indicates a short circuit condition, such as conductor 34 being connected to ground.

In state S-4 in FIG. 3, the signal from the logic input means 41 remains high and the signal from logic input means 60 goes high, thereby closing the normally-open switch means 61 and grounding the node 65 in the detection channels 39. Accordingly, in state S-4, any charge which had accumulated upon the capacitor 23 during state S-3 will be dissipated to the ground 62. During such discharge of capacitor 23 in state S-4, the probe member 15 will essentially reverse its polarity and, thereby, recover all of the charge transferred through the ionic liquid during state S-3, in a manner identical to that already discussed for capacitor 21 in states S-1 and S-2. Thus, total charge transfer from both the probes 13 and 15 will be zero over an operating cycle of the level detection system of the present invention; this is true whether one considers charge transfer between the two probes, or between either probe and the grounded vessel 35. In this use, then, the system has simulated one receiving ac signals, even though only dc input signals are utilized.

The fourth combination of signals providable by the logic input means 41 and 60, namely the low-low state, is not illustrated in FIG. 3 because it is the system "off" condition. In that state, the first and second switch means 40 and 61 are both open. During this state, if there is energy available at voltage sources 49 and 58, capacitors 21 and 23 would both accumulate charge and the steady-state potential difference across each of those capacitors will equal the voltages at the voltage sources 49 and 58, respectively. Even so, when state S-1 is initiated by closure of switch means 61, capacitor 23 will quickly discharge to the ground 62 via the node 65 and, likewise, capacitor 21 will discharge to the ground 62 via the diode 29 until such time as the electrical potential on capacitor 21 equals the voltage drop across the diode 29.

In implementing the present invention, it is contemplated and convenient to include conventional logic means in conjunction with the voltage-sensing means 64 and 55. Such logic means, as is well known in the electronics art, can accomplish sampling the voltage levels at predetermined time periods. (In one embodiment of the present invention, such sampling would occur about every 24 milliseconds.)

Figure 7:
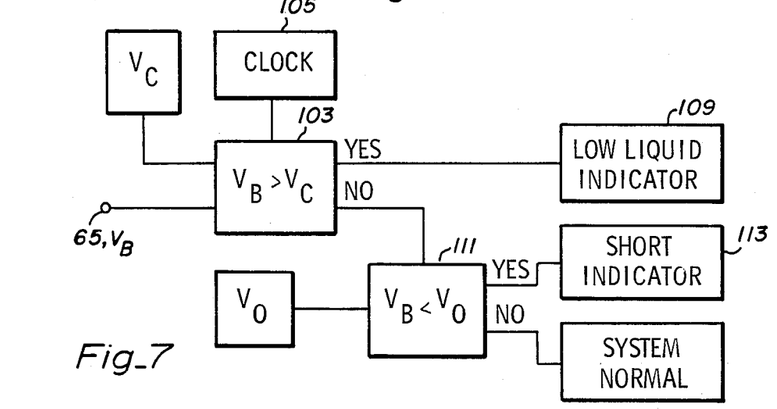
FIG. 7 is a block diagram showing one example of logic means utilized in conjunction with the second probe member of the liquid level detection system of FIG. 2.

A diagram for such logic means for use with the second detection channel 39 is shown, by way of example, in FIG. 7. In that diagram, block 103 indicates the step, taken periodically during state S-3, of comparing the voltage $V_B$ sensed by means 64 with a predetermined constant value $V_C$. Such a relative comparison may be accomplished, for example, in a conventional voltage comparator or the like which is strobed periodically by a clock 105. Accordingly, a determination will be made as to whether, at the predetermined time of comparison in state S-3, the actual voltage $V_B$ sensed at node 65 exceeds the predetermined constant value $V_C$.

Figure 8:
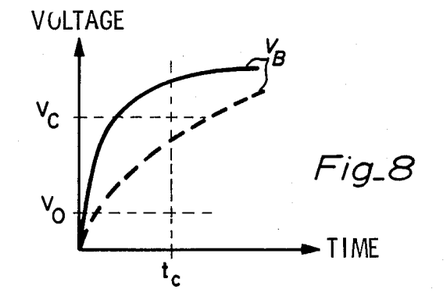
FIG. 8 is a graph showing voltages which can be established at various times on a capacitor associated with the second probe member.

If the constant voltage $V_C$ is exceeded at the time of comparison in state S-3, this indicates that the liquid level in the vessel 35 of FIG. 2 has fallen below the position of the probe 15. Such a condition is indicated by the solid line in state S-3 in FIG. 3. This condition is also shown in FIG. 8, which drawing includes the comparison time $t_c$, and the predetermined constant voltage value $V_C$ which would be typical if liquid surrounded the probes at time $t_s$, as well as a value $V_O$ which would be typical if no liquid were present at the probes at time $t_c$. If the comparison of $V_B$ with the predetermined constant voltage $V_C$ at time $t_c$ indicates that $V_B$ exceeds $V_C$ and, thereby, indicates that the probe means 15 is not surrounded by ionic liquid, this information can be displayed by an indicator such as a light-emitting diode, a warning lamp, or other means indicated by numeral 109 in FIG. 7. In addition, the determination can be utilized to control other functions in a vehicle monitoring system.

If the sensed voltage $V_B$ is less than the predetermined voltage $V_C$, then a second comparison can be made to determine whether a short circuit condition exists. To accomplish this, a comparison can be made at comparator 111 with a second constant voltage $V_O$ having a predetermined low value. If the sensed voltage $V_B$ is less than $V_O$, this indicates that a short circuit condition exists. Again, this information may be suitably displayed by conventional indicator 113 means. If the sensed voltage $V_B$ is greater than $V_O$, this indicates the system is operating normally and that the probe 15 of FIG. 2 is surrounded by electrically-conductive liquid; it is a matter of design choice as to whether such information is, or is not, displayed.

The predetermined time periods at which the voltage comparisons are made can be determined, for example, by the clock 105 controlling a gate at the comparator 103. In practice, it is desirable to provide a delay capability, normally less than about five seconds, at the low liquid indicator 109 to prevent false indications of the steady state liquid level; such false indications might occur, for instance, because of sloshing of the liquid due to physical movement of containing vessel 35. Such a delay capability may be provided by conventional logic gate means, not shown, connected to permit energization of the low level liquid indicator only after a certain number of "yes" signals are received at indicator 109 for a given period, say several seconds. Further, the clock means 105 can be connected to logic input means 41 and 60 of FIG. 2, so that operation of the channels 38 and 39 is synchronized.

Although the preceding discussion of comparator 103 focused upon comparisons of the magnitude, or level, of voltages $V_B$ at the node 65, it is also possible that the second detection channel 39 could operate by comparing the rate of change of voltage $V_B$ with a preselected value. Such comparisons could be utilized to distinguish between the solid curve and the dashed curve in FIG. 8 and, hence, to distinguish between the situations where ionic liquid is, or is not, in contact with the second probe member 15. Such a mode of operation is not, however, preferred.

It may be emphasized that $V_C$ is an arbitrary voltage and may, in fact, be a relatively high voltage such as that of the constant voltage sources 49 and 58 in FIG. 2. In such a situation, the comparison at comparator 103 will determine whether the voltage $V_B$ is less than the high voltage; then, if the second comparison at comparator 111 indicates that the voltage $V_B$ is greater than the low voltage $V_O$, the two comparisons together would indicate that ionic fluid is in contact with the first and second probe members 13 and 15.

Figure 9:
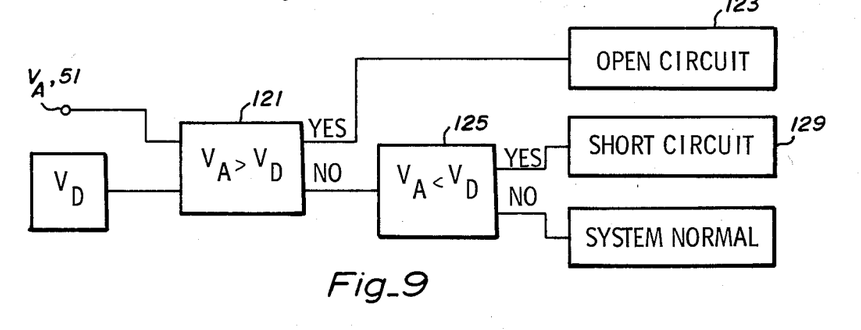
FIG. 9 is a block diagram showing one example of logic means utilized in conjunction with the first probe member of the liquid level detection system of FIG. 2.

In FIG. 9, there is shown a diagram for logic means which can be utilized to implement the self-test capabilities inherent in the first detection channel 38 of FIG. 2. In that diagram, block 121 indicates the step, taken during state S-1, of comparing the voltage $V_A$ at node 51 with a predetermined constant value $V_D$. In practice, the constant voltage $V_D$ represents the forward voltage drop across the diode 29 of FIGS. 1 and 2, and equals about 0.6 volts. Such comparison may be made, for example, in a conventional voltage comparator or other comparison means.

If voltage $V_A$ is determined to substantially exceed voltage $V_D$ in state S-2, then this is an indication of an open circuit condition, as previously described. Accordingly, the output of the comparator 121 under such circumstances can be utilized to actuate an open circuit indicator 123 such as a light-emitting diode, a warning lamp or the like. On the other hand, a determination of whether the voltage $V_A$ at node 51 is less than the voltage drop across the diode 29 in FIG. 2 can be made by a second comparator 125 in FIG. 9. In the case where the $V_A$ is less than $V_D$, the output of the comparator 125 can be utilized to actuate a short circuit indicator 129. The indicator 129 can be essentially the same as the one 113 previously described in conjunction with FIG. 7. In the case where the indication from comparator 125 is negative, this is an indication that the voltage $V_A$ equals the expected voltage drop across the diode 29 and, accordingly, the detection channel 38 of FIG. 2 is operating normally. Display of such information is a matter of design choice.

Particularly with regard to the logic means described and illustrated in conjunction with FIGS. 7 and 9, it should be understood that equivalent means can readily be provided by those skilled in the art to accomplish the desired functions. Also, additional functions can be provided. Still further, a computer program can readily be provided to control and synchronize operation of the system, whose output signals may, in conjunction with the controlling program, be converted from analog-to-digital form.

Figure 4:
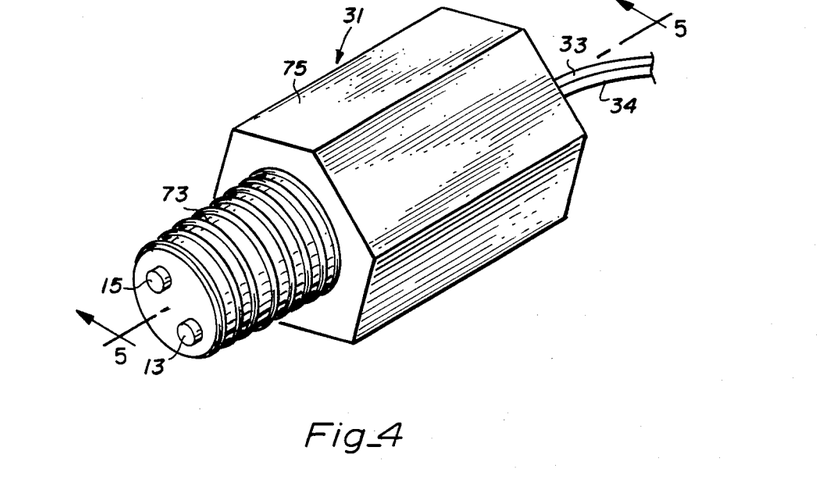
FIG. 4 is a perspective of the sensor means.
Figure 5:
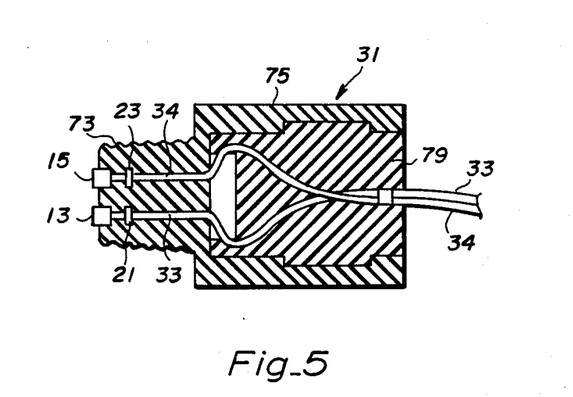
FIG. 5 is a longitudinal central cross-sectional view of the sensor means taken along the line 5—5 of FIG. 4, showing first and second probe members.

In FIGS. 4 and 5, there is shown one embodiment of sensor means for use with a level detection system according to the present invention. In this embodiment, the probe members 13 and 15 extend longitudinally, in spaced-apart parallel relationship, through a nipple-like member 73 which is secured into a body section or encapsulment 75. Taken together, the nipple-like member 73 and the body portion 75 may be understood to comprise the previously-discussed insulating socket member 31. The body section may be formed, for example, of thermoplastic or other relatively inert material which is resistant to chemical degradation by the ionic liquid of interest. (In a typical application, the body portion 75 will be about one inch in diameter, and the nipple-like member 73 will extend axially about an inch from the body section to protrude into the electrically-conductive liquid with the ends of the probe members 13 and 15 exposed to the liquid.

In practice of the present invention, the first and second probe members 13 and 15 may be metallic elements of almost any form which are fixedly mounted to protrude a short distance into the ionic liquid in the vessel 35. In one instance, the probe members were formed from brass, but any electrically-conductive metal or alloy will suffice. It is important that the probe members are spaced apart so they do not physically touch one another, and that they are electrically isolated from direct contact with the body of the vessel 35 by the insulating socket member 31. Further, in practice, it is important that the first and second probe members 13 and 15 be mounted with their exposed portions in the ionic liquid in close enough proximity to one another that each provides a "local" ground for the other to work against. In other words, with the probe members in relatively close proximity to one another, it is not necessary to provide the ground for the vessel 35 as shown in FIG. 2; this is because, with the probe members in proximity to one another, essentially all of the electrochemical ionic charge flow is between the two probes. Again, over an operating cycle of the system, this feature operates to minimize electrochemical degradation of the metallic probes.

As best shown in FIG. 5, the capacitors 21 and 23 may be located relatively close to the ends of the respective probe members 13 and 15. The body section 75 may be sealed by a plug member 79.

Although the present invention has been described with particular reference to the illustrated preferred embodiments, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all such alterations, modifications and embodiments as fall within the true spirit and scope of the present invention.

We claim:

1. A system for detecting the presence and absence of an electrically-conductive liquid at a particular level in a vessel comprising:
    (a) first and second metallic probe members for mounting at a fixed location within the interior of a vessel containing electrically-conductive liquid;
    (b) first and second capacitor means connected to the first and second probe members, respectively;
    (c) first switch means to selectively couple the first capacitor means to ground, and second switch means to concomitantly couple a constant voltage source to the second capacitor means;
    (d) comparator means connected to said second capacitor means to sense the magnitude of the electrical charge thereon at predetermined times following coupling of the second capacitor means to the voltage source, the sensed charge magnitude being indicative of the presence of electrically-conductive liquid surrounding the second probe member; and
    (e) indicator means coupled to the comparator means and responsive thereto to indicate the presence of electrically-conductive liquid at the level in the vessel at which the second probe member is mounted.

2. A system according to claim 1 wherein the comparator means includes means to compare the voltage on the capacitor means with a predetermined constant value and, thereby, discriminates between the presence of liquid surrounding the first and second probe members.

3. A system according to claim 2 further including:
    clock means coupled to the comparator means to control the times at which the comparator means compares the charge on the second capacitor means with the predetermined constant value.

4. A system according to claim 2 wherein:
    the comparator means compares the charge on the second capacitor means with a second predetermined constant value less than said first predetermined constant value to provide an indication of whether a short circuit exists in the system.

5. A system according to claim 1 further including:
    first and second logic input means coupled to control the first and second switch means, respectively, so that the first switch means selectively couples the first capacitor means to ground and to a constant voltage source depending upon the output of the first logic input means, and, likewise, the second switch means selectively couples the second capacitor means to ground and to a constant voltage source depending upon the output of the second logic input means.

6. A system according to claim 5 wherein:
said first switch means includes a transistor whose base is connected to receive output pulses from the first logic input means, and whose emitter and collector are connected between said constant voltage source and ground; and
said second switch means includes a transistor whose base is connected to receive output pulses from the second logic input means, and whose emitter and collector are connected between said constant voltage source and ground.

7. A system according to claim 1 wherein:
the first switch means is operable to selectively couple the first capacitor means to ground and to the constant voltage source and, the second switch means is operable to selectively couple the second capacitor means to ground and the constant voltage source;
and said system further includes a diode means connecting said first and second capacitor means so that current can only flow through said diode means from the first capacitor means to the second capacitor means.

8. A system according to claim 7 including:
a second comparator means connected in electrical communication with the first capacitor means to sense the magnitude of an electrical charge thereon at a predetermined time following coupling of the first capacitor means to the constant voltage source and coupling of the second capacitor means to ground by said first and second switch means, respectively, the comparison of the charge magnitude on the second capacitor means relative to the expected voltage drop across said diode means being indicative of whether a short circuit condition and an open circuit condition exits in the system.

9. A system according to claim 8 further including:
second indicator means coupled to said second comparator means and responsive thereto to indicate whether the magnitude of the electrical charge sensed on the first capacitor means exceeds a predetermined value approximating the expected voltage drop across the diode means, thereby indicating an open-circuit condition in the system.

10. A system according to claim 9 further including:
third indicator means coupled to said second comparator means and responsive thereto to indicate whether the magnitude of the electrical charge sensed on the first capacitor means is less than a predetermined value approximating the expected voltage drop across the diode means, thereby indicating a short circuit condition in the system at predetermined time periods.

11. A system according to claim 1 further including:
an electrically-insulating housing which holds the first and second probe members in spaced-apart relationship to extend into the electrically-conductive liquid in the vessel while being electrically insulated from direct physical contact with the vessel, said probe members being mounted in proximity to one another to provide a ground for each other.

12. A system according to claim 11 wherein:
the first and second capacitor means are mounted with said housing in close proximity to said first and second metallic probe members, respectively.

13. A method for detecting the presence or absence of an electrically-conductive liquid at a particular level within a vessel comprising the steps of:
(a) mounting first and second metallic probe members at a fixed location within a vessel for containing electrically-conductive liquid;
(b) connecting first and second capacitor means to the first and second probe members, respectively;
(c) at a first predetermined time, connecting the second probe member to a constant voltage source, connecting the first probe member to ground, and providing diode means between the first and second capacitor means so that current can only flow through the diode from the first capacitor means to the second capacitor means;
(d) comparing the magnitude of electrical charge on the second capacitor means with a first constant value and, thereby, discriminating between the presence or absence of ionic liquid surrounding the second probe member.

14. A method according to claim 13 further including the steps of:
indicating whether the electrical charge on the second capacitor means exceeds the constant value and, accordingly, indicating that ionic liquid is not in contact with the second probe member.

15. A method according to claim 14 further including the steps of:
comparing the magnitude of electrical charge on the second capacitor means with a second constant value less than the first constant value and, if the magnitude of the charge is less than said second constant value, indicating that a short circuit condition exists in the system.

16. A method according to claim 15 further including the steps of:
subsequently coupling the second capacitor means to ground, and coupling the first capacitor means to a constant voltage source;
comparing the magnitude of electrical charge on the first capacitor means with a predetermined constant value approximately the expected voltage drop across the diode means; and
indicating whether the voltage on the first capacitor means is less than the expected voltage drop, which is an indication that a short circuit exists in the system.

17. A method according to claim 16 further including the step of:
indicating whether the voltage on the first capacitor means exceeds the expected voltage drop across the diode means, which is an indication that an open circuit condition exists in the system.

18. A method according to claim 13 further including the steps of:
alternatively connecting the first and second capacitor means between ground and a constant voltage source so that, over a cycle of operation, there will be no net charge transferred to, or from, the probe members.

19. A method for detecting the presence or absence of ionic liquid surrounding first and second adjacent metallic probe members comprising the steps of:
(a) connecting first and second capacitor means to the first and second probe members respectively, (b) connecting diode means between the first and second capacitor means so that current can only flow through the diode from the first capacitor means to the second capacitor means;

in a first state, coupling the first capacitor means to a constant voltage source while concommitantly coupling the second capacitor means to ground, and determining whether the voltage at the first capacitor means equals the expected voltage drop across the diode means;

in a second state, subsequently coupling both the first and second capacitor means to ground, so that when the first probe means is surrounded by ionic liquids there is no net charge electrochemically transferred to the first probe member during the first and second states taken together;

in a third state, coupling the second probe means to a constant voltage source and determining, at a predetermined time, whether the voltage at the second capacitor means exceeds a first constant value, thereby discriminating between a condition where ionic liquid surrounds the second probe means and the condition where ionic liquid does not surround the second probe means; and in a fourth state, coupling both the first and second capacitor means to ground so that, when the second probe means is surrounded by ionic liquid, there is no net charge electrochemically transferred to the second probe member during the third and fourth states taken together.

20. A method according to claim 19 including the step of mounting
the first and second probe members in proximity to one another to provide a ground for each other.

21. A method according to claim 20 including
cycling through the first, second, third and fourth states in a period of about one-quarter of a second.

* * * * *

UNITED STATES PATENT AND TRADEMARK OFFICE
CERTIFICATE OF CORRECTION

PATENT NO. : 4,628,302

DATED : December 9, 1986

INVENTOR(S) : Barr et al.

It is certified that error appears in the above—identified patent and that said Letters Patent is hereby corrected as shown below:

Column 4, line 63 "non-conducting" should be --conducting--.

Signed and Sealed this

Twenty-fourth Day of March, 1987

Attest:

DONALD J. QUIGG

Attesting Officer     Commissioner of Patents and Trademarks